United States Patent [19]

Gall

[11] 4,236,174

[45] Nov. 25, 1980

[54] COLOR CORRECTION OF IMAGE DISPLAY

[76] Inventor: Ferenc Gall, Am Vogelsang 139,, 8000 Munich 82, Fed. Rep. of Germany

[21] Appl. No.: 18,543

[22] Filed: Mar. 8, 1979

[30] Foreign Application Priority Data

Oct. 1, 1978 [DE] Fed. Rep. of Germany ....... 2810430

[51] Int. Cl.³ .................. H04N 9/535; H04N 1/46
[52] U.S. Cl. ................................ 358/22; 358/80
[58] Field of Search ............... 358/80, 27, 76, 28, 358/21, 22, 109, 81, 82, 78

[56] References Cited

U.S. PATENT DOCUMENTS 4,127,871  11/1978  Sakamoto ........................... 358/80

Primary Examiner—John C. Martin
Attorney, Agent, or Firm—Ralph G. Hohenfeldt

[57] ABSTRACT

A method for the correction of the colors of an image, the image being split up into a plurality of image points, wherein a color to undergo maximum correction and a spatially limited domain around the extremity of the vector associated with it in the color space are selected, for each of the image points whose color is to be corrected a test is made to determine whether a color vector associated with the point has its extremity in the domain and correction by addition of a color correction vector is carried out for the color vectors whose extremity is located within the domain, the color correction vector resulting from a freely selectable vector and a superimposed quantity which makes the color correction vector maximum if the color vector to be corrected coincides with the vector of the color which is to undergo maximum correction and which makes it to be the closer to zero the closer the extremity of the color vector to be corrected is to the edge of the domain. Further a hardware corrector circuit for performing said method is disclosed.

9 Claims, 1 Drawing Figure

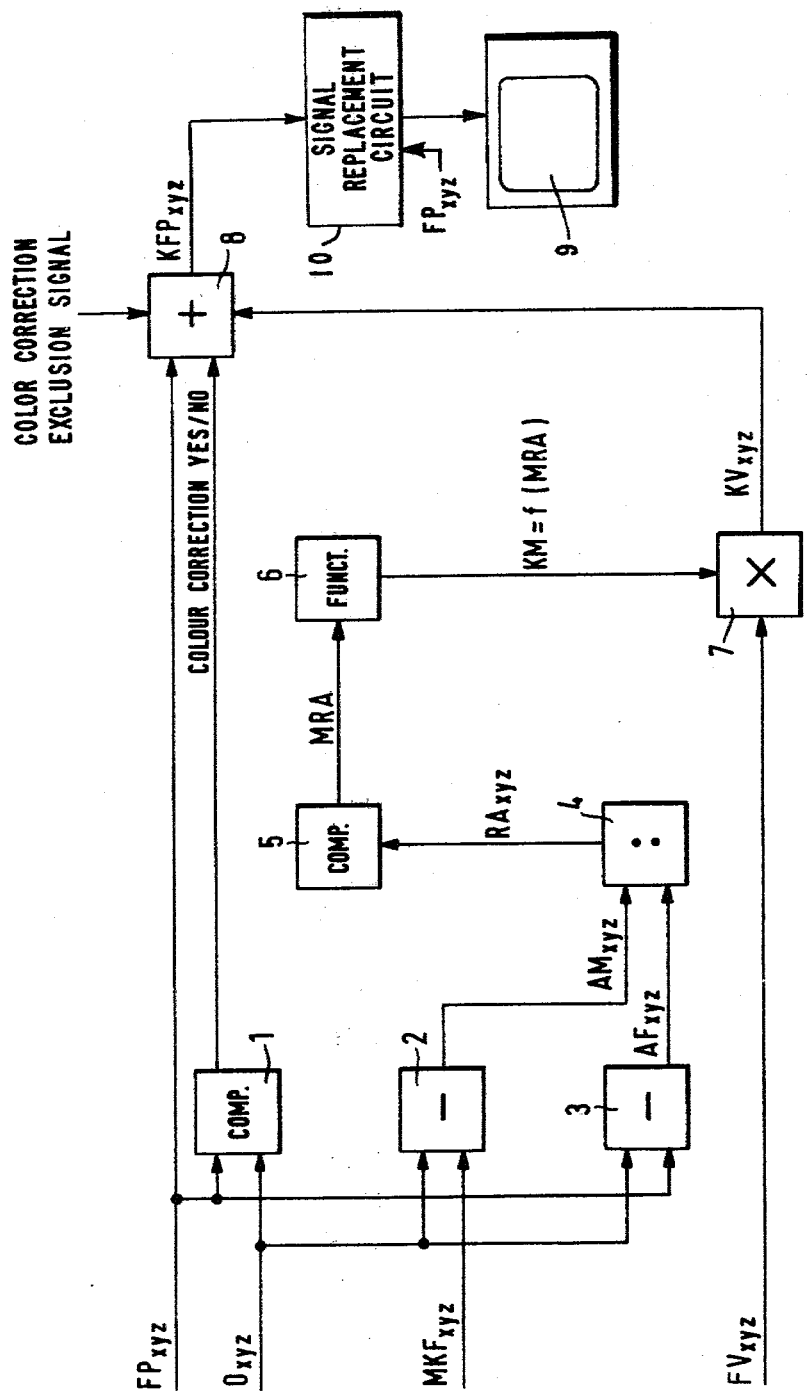

COLOR CORRECTION OF IMAGE DISPLAY

The invention relates to a method for the correction of the colors of an image, the image being split up into a plurality of image points, as well as to an apparatus for the performance thereof.

It is known both in color television technology and in military digital image processing to carry out a color correction by changes in the three primary colors. The color shade or tint of the resulting corrected images are greatly changed compared with the initial images. The advantage of this triple one-dimensional color correction is the simplicity and rapidity with which it can be performed. However, it has the important disadvantage that the correction possibilities are limited to overall changes.

In graphic scanner technology, it is conventional practice to combine by subtraction and addition the color signals present in analog form in such a way that the color space is divided up into usually eight approximately equally large domains (red, orange, yellow, green, blue, violet, pink, brown) in which selective corrections can then be performed. This method has the disadvantage that on the one hand digital data can scarcely be corrected in analog manner and on the other that the subdivision of the color space into fixed areas does not offer an adequate flexibility.

Furthermore, a digital method is known in which prior to image correction, a process computer calculates and provides a look-up table of correction factors or of corrected color values in the three-dimensional color space and builds up in a high-speed memory. The image points then pass into the look-up table, the first four to six bits of each of the color components being used as the address of the look-up table and the remainder being for determining the interpolation scale for the interpolater connected behind the look-up table. This method permits a high correction speed and random selective corrections, but has the important disadvantage that prior to correction the look-up table must be built up which requires a disproportionately long time.

SUMMARY OF THE INVENTION

An objective achieved with the present invention is to provide a color correction method, which overall permits a rapid and selective color correction.

According to the invention, this objective is achieved in that a color to undergo maximum correction and a spatially limited domain around the extremity of the vector associated with it in the color space are selected, for each of the image points whose color is to be corrected a check is made to determine whether a color vector associated with it has its extremity in the domain and correction by addition of a color correction vector is carried out for the color vectors whose extremity is located within the domain, the color correction vector resulting from a freely selectable vector and a superimposed quantity which makes the color correction vector maximum if the color vector to be corrected coincides with the vector of the color which is to undergo maximum correction and which makes it to be the closer to zero the closer the extremity of the color vector to be corrected is to the edge of the domain. With such a method, a high operating speed can be attained with the aid of a calculating logic, particularly in the case of digital representation. The free predetermination of the color to undergo maximum correction and of the surrounding color area for which only a correction is performed give great flexibility to the present method. Thus, for example, it is possible to correct only the brown tints in an image and leave the remaining tints unchanged. However, if a correction of the brown tints was attempted to be carried out by corrections to the three primary colors, this would necessarily lead to a change of other tints which are naturally also formed from the three primary colors. The reduction of the color correction occurring with the method of the invention, which correction increases the further the color to be corrected is from the color to undergo maximum correction, ensures that the corrections take place gradually and that the corrected image contains no color fringing due to undesired color jumps.

In order to bring about a suitable reduction of the color correction with increasing approximation of the color vector to be corrected at the edge of the correction range defined in the color space, it is particularly advantageous to determine the superimposed quantity which is codeterminative for the color correction vector as a function of the minimum of the ratios of the distances of the extremity of the color to be corrected from the points of the domain periphery to the distances of the extremity of the vector of the color to undergo maximum correction from, in each case, the identical points of the domain periphery. The domain in the color space is preferably selected in such a way that it can easily be mathematically determined. Preferably, the domain is therefore selected as a sphere. This is particularly advantageous when representing the color vectors in the color space in polar coordinates. When Cartesian coordinates are used, it is particularly advantageous to use as the domain or volume a cube with sides parallel to the color space axes. It is then particularly advantageous to determine the superimposed quantity as the minimum of the ratios of the distances of the extremity of the vector of the color to be corrected from the cube surfaces to the distances of the extremity of the vector of the color to undergo maximum correction from, in each case, the identical cube surfaces. Thus, for each cube surface in the distance of the extremity of the vector of the color to be corrected and the distance of the extremity of the vector of the color to undergo maximum correction from said cube surface are determined. For each cube surface, the ratio of these distances is formed with the distance of the extremity of the vector of the color to undergo maximum correction as a divisor. The minimum of said ratios is used as the superimposed quantity, the freely selectable vector being multiplied with said superimposed quantity as the factor. Therefore, if the color vector to be corrected coincides with the vector of the color to undergo maximum correction, the factor is equal to 1 and the color correction vector equals the freely selectable vector. If the vector of the color to be corrected approaches the edge of the color correction cube the factor and therefore the color correction vector move towards 0. If the above-defined ratio minimum is directly used as the factor for the freely selectable vector there is a linear decrease of correction towards the edge of the color correction area. However, the superimposed quantity can also be any function of the ratio minimum which decreases in monotonic (e.g. bell-shaped) manner from 1 to 0, if the ratio minimum passes from 1 to 0.

According to a preferred embodiment of the invention, the color image is reproduced on a viewing screen and the color to undergo maximum correction and/or the domain, particularly the cube, are adjusted with respect to position and size in accordance with the visual observations on the screen. The method is preferably carried out in such a way that in the image reproduced on the screen, the original colors are replaced by the corrected colors. To provide the possibility of the same tint remaining unchanged in one spatial portion of the image, but undergoing correction in another portion, according to a preferred embodiment of the method, parts of the image are excluded from correction independently of the colors of the image points contained therein.

A logic circuit is provided for performing the new color correction method and this comprises a first comparator circuit fed with the domain-defining coordinates and the coordinates of the color vector of the investigated image point, a first subtracting circuit fed with the domain-defining coordinates and the coordinates of the vector of the color to undergo maximum correction, a second subtracting circuit fed with the domain-defining coordinates and the coordinates of the color vector of the investigated image point, a dividing circuit for determining the quotient of its input quantities fed with the output quantities of the first and second subtracting circuits, a second comparator circuit for determining the minimum of the quotients fed with the output quantities of the dividing circuit, a circuit for the delivery of the superimposed quantity as a function of the output quantity of the second comparator circuit and fed with the output quantity of said comparator circuit, a multiplying circuit fed with the output quantity of the circuit for delivering the superimposed quantity and the coordinates of a freely selectable vector and an adding circuit fed with the coordinates of the color vector to be corrected and the output quantity of the multiplying circuit and which has an inhibition input subject to the action of the output quantity of the first comparator circuit.

DESCRIPTION OF THE DRAWING AND PREFERRED EMBODIMENTS

The single drawing shows a block circuit diagram of an embodiment of the logic circuit of the invention for the case that the correction domain is a cube with sides parallel to the color space axes.

The coordinates of the color vector $FP_{xyz}$ of the just considered image point on the one hand and the coordinates $O_{xyz}$ determining the correction cube on the other are fed into a first comparator circuit 1. If the comparison of the coordinates reveals that the extremity of the color vector of the considered image point is in the color correction cube, an adding circuit 8, into which is fed the color coordinates of the considered point and the coordinates of a color correction vector $KV_{xyz}$, adds up these two vectors giving a corrected color vector $KFP_{xyz}$ for the considered image point. If the result of the comparison in the first comparator circuit 1 shows that the color vector of the considered image point does not have its extremity in the color correction cube, then the adding circuit 8 is inhibited by the output signal of comparator circuit 1.

The coordinates defining the color correction cube are also fed into a subtracting circuit 2 into which is also fed the coordinates of the vector $MKF_{xyz}$ which is to undergo maximum correction. By subtraction in subtracting circuit 2, the distances $AM_{xyz}$ of the extremity of the vector of the color to undergo maximum correction from the surfaces of the color correction cube are determined. The coordinates $O_{xyz}$ defining the color correction cube and the coordinates of the color vector $FP_{xyz}$ of the considered image point are fed into a second subtracting circuit 3. The subtraction performed in subtracting circuit 3 supplies the distances $AF_{xyz}$ of the extremity of the color vector from the surfaces of the color correction cube. Relative distances $RA_{xyz}$ are determined by division in a dividing circuit 4 receiving at its inputs on the one hand the distances for the vector of the color to undergo maximum correction and on the other the distances for the vector of the color of the image point considered. The minimum MRA (minimum relative distance) of the relative distances is determined in a second comparator circuit 5 receiving on the input side said relative distances. The minimum of the relative distances is fed into a circuit 6 which, at its output, delivers a function passing in monotonic manner between 0 to 1 with the minimum relative distance. This monotonic function is related in a linear or more complicated (e.g. bell-shaped) manner with the minimum of the relative distances. The monotonic function is fed into a multiplying circuit 7 into which are also fed the coordinates of a freely selectable vector $FV_{xyz}$ in the color space. By multiplying the monotonic function of the minimum of the relative distances by the freely selected vector in the color space, the multiplying circuit 7 produces the color correction vector $KV_{xyz}$, which is fed into adding circuit 8 for adding to the color vector of the considered image point. Thus, the monotonic function represents the superimposed quantity for the freely selected vector in the color space. An additional input to adding circuit 8 receives a signal, designated as a color correction exclusion signal, to cause exclusion of parts of the image from color correction independently of the image points contained therein as mentioned earlier.

A reduced set of image points of an image to be color corrected is reproduced on a T.V. viewing screen 9. The colors of these image points may be replaced on viewing screen 9 by the corrected colors. Though, as stated below, for resolution reasons, only a subset of the image points can be produced on the viewing screen 9 but the image points which are not reproduced are, of course, also corrected. Spatial parts of the image may, however, be excluded from color correction so that their original colors are maintained.

In the block circuit diagram shown in the FIGURE the data lines are illustrated in a simplified manner. Generally, data are handled in a 24-bit parallel word representing the color information of an elemental area of the image and describing the three vector components in the directions of the coordinate axes with 8-bit resolution for each component (higher resolution is, of course, also possible). Therefore, except for the lines transferring MRA and KM, which are 8-bit parallel lines, all other lines are 24-bit parallel lines. Correspondingly, the shown blocks 1, 2, 3, 4, 5, 7 and 8 are made up of three independent systems, each for 8-bit parallel data. Only block 6 performs a single 8-bit table look-up function.

The correction parameter $O_{xyz}$, $MFK_{xyz}$ and $FV_{xyz}$ are static (i.e. only changed very slowly by hand) whereas $FP_{xyz}$ and $KFP_{xyz}$ are fast data according to CRT (cathode ray tube) refresh data rates or fast computer I/O-rates.

Additional clock circuits to manage the data flow through the entire logic circuit are not shown. Especially for CRT data rates the clock circuit would include a fast fifo (first in - first out) memory in the $FP_{xyz}$ line to compensate the delay of the signal running time through the circuit. Otherwise the adding circuit 8 would not operate correctly. The block circuit diagram does not show the input and output latches on each block which are necessary for accurate timing.

The color vectors of all image points can be supplied sequentially by a digital memory. The preferred procedure is that a representative selection of the stored image points is reproduced by means of a color screen 9, the circuit or computing program being built up in such a way that the original colors are always replaced by the corrected colors in the represented image. In order for the original colors to be replaced on the screen by the corrected colors, a block representative of a signal replacement circuit 10 is provided and it has an input for the $FP_{xyz}$ signal. By observing the viewing screen, the operator can decide how to select the freely selectable vector which gives the color correction vector after multiplying with the superimposed quantity. The freely selectable vector can be fed into the system by means of knobs or the like. Furthermore, as a result of what is seen on the screen 9, the position and size of the color correction cube are adjusted relative to the vector of the color to undergo maximum correction. It can thereby be extremely advantageous not to place the center point of the color correction cube (or optionally a differently shaped domain) on the extremity of the vector of the color to undergo maximum correction. If following the first correction, the color values are not satisfactory, further correction can be performed with a modified color correction vector. The representation with a representative selection of image points on the screen does not therefore lead to difficulties, because the high precision and complete accuracy of the method according to the invention, the image points which are not shown can be corrected in exactly the same way as those which are shown on the screen.

According to a further embodiment of the invention the color correction is not performed with the aid of a specially constructed logic circuit, but instead a freely programmable computer with corresponding computer programs is used. The freely selectable vector can then, for example, be fed in by means of a teletype terminal of the computer.

The color correction method of the invention is particularly suitable for graphic art image reproduction.

An example of such image reproduction using the color correction method of the invention is as follows:

The image to be reproduced is scanned in a scanner whereafter the primary colors yellow, magenta and cyan are separated in a color separator circuit. The separated color data are digitized in an analog to digital converter to obtain high resolution image digital data which are averaged down in an average-down circuit using a certain averaging function. This is done to decrease the number of image data to an extent that the reduced image is reproduceable on a TV-screen having a limited resolution (of maximally 512×512 dots). The high resolution image data are stored in a mass storage managed by a host computer while the averaged down image data are transmitted to an interactive graphic terminal in which the image data are color-corrected according to the method of the invention. This correction is managed by the operator sitting in front of the TV-screen and changing the correction parameter by hand (using knobs or joysticks, track balls etc. acting on the below-mentioned hardware corrector circuit within the interactive graphic terminal) according to the visual impression of the immediately displayed corrected color image. This immediate color correction is performed by a hardware corrector located between the display refresh memory of the interactive terminal and the cathode ray (CRT) on which the image is displayed. According to the standard TV-frequencies or enhanced frequencies of higher resolution tubes the hardware corrector works at a 6 to 10 MHz throughput rate. The hardware corrector circuit is basically shown as a block diagram in the FIGURE. Principally speaking, the image can also be corrected using software but a long computing time would not allow to display the corrected image immediately.

The invention is not limited to the embodiments described and represented hereinbefore and various modifications can be made thereto without passing beyond the scope of the invention.

I claim:

1. A method for the correction of the colors of an image, the image being split up into a plurality of image points, wherein a color to undergo maximum correction and a spatially limited domain around the extremity of the vector associated with it in the color space are selected, for each of the image points whose color is to be corrected a test is made to determine whether a color vector associated with the point has its extremity in the domain and correction by addition of a color correction vector is carried out for the color vectors whose extremity is located within the domain, the color correction vector resulting from a freely selectable vector and a superimposed quantity which makes the color correction vector maximum if the color vector to be corrected coincides with the vector of the color which is to undergo maximum correction and which makes it to be the closer to zero the closer the extremity of the color vector to be corrected is to the edge of the domain.

2. A method according to claim 1, wherein the superimposed quantity is determined as a function of the minimum of the ratios of the distances of the extremity of the vector of the color to be corrected from the points of the domain periphery to the distances of the extremity of the vector of the color to undergo maximum correction from, in each case, the identical points of the domain periphery.

3. A method according to claim 1, wherein the domain is a sphere.

4. A method according to claim 1, wherein the domain is a cube with sides parallel to the color space axes.

5. A method according to claim 4, wherein said superimposed quantity is determined as the minimum of the ratios of the distances of the extremity of the vector of the color to be corrected from the cube surfaces to the distances of the extremity of the vector of the color to undergo maximum correction from, in each case, the identical cube surfaces.

6. A method according to claim 1, wherein the color image is reproduced on a viewing screen and the region and/or color to undergo maximum correction are adjusted with respect to position and size in accordance with the visual observations on the screen.

7. A method according to claim 6, wherein the original colors are replaced by the corrected colors in the image reproduced on said viewing screen.

8. A method according to claim 1, wherein parts of the image are excluded from correction, independently of the colors of the image points contained therein.

9. A logic circuit for performing the method according to claim 1, wherein a first comparator circuit fed with the domain-defining coordinates and the coordinates of the color vector of an image point, a first subtracting circuit fed with the domain-defining coordinates and the coordinates of the vector of the color to undergo maximum correction, a second subtracting circuit fed with the domain-defining coordinates and the coordinates of the color vector of the investigated image point, a dividing circuit for determining the quotient of its input quantities fed with the output quantities of the first and second subtracting circuits, a second comparator circuit for determining the minimum of the quotient fed with the output quantities of the dividing circuits, a circuit for the delivery of the superimposed quantity as a function of the output quantity of the second comparator circuit and fed with the output quantity of said comparator circuit, a multiplying circuit fed with the output quantity of the circuit for delivering the superimposed quantity and the coordinates of a freely selectable vector and an adding circuit fed with the coordinates of the color vector to be corrected and the output quantity of the multiplying circuit and which has an inhibition input subject to the action of the output quantity of the first comparator circuit.

* * * * *